United States Patent
Woolliams et al.

(10) Patent No.: US 10,044,053 B2
(45) Date of Patent: Aug. 7, 2018

(54) FREEZE START METHOD FOR FUEL CELLS

(75) Inventors: Elisabeth Funk Woolliams, Vancouver (CA); Richard G. Fellows, Vancouver (CA); Adrian Kent Roett, New Westminster (CA); Laura Iwan, Burnaby (CA); Matthew Blair Guenther, Vancouver (CA); Christopher Richards, Port Coquitlam (CA)

(73) Assignees: Daimler AG, Stuttgart (DE); Ford Motor Company, Dearborn, MI (US)

( * ) Notice: Subject to any disclaimer, the term of this patent is extended or adjusted under 35 U.S.C. 154(b) by 986 days.

(21) Appl. No.: 13/823,890

(22) PCT Filed: Oct. 13, 2011

(86) PCT No.: PCT/EP2011/005134
§ 371 (c)(1),
(2), (4) Date: Apr. 15, 2013

(87) PCT Pub. No.: WO2012/048875
PCT Pub. Date: Apr. 19, 2012

(65) Prior Publication Data
US 2013/0196241 A1    Aug. 1, 2013

Related U.S. Application Data

(63) Continuation of application No. 12/905,325, filed on Oct. 15, 2010, now abandoned.

(51) Int. Cl.
*H01M 8/04* (2016.01)
*H01M 8/04302* (2016.01)
(Continued)

(52) U.S. Cl.
CPC ... *H01M 8/04302* (2016.02); *H01M 8/04223* (2013.01); *H01M 8/04253* (2013.01); *H01M 8/2457* (2016.02)

(58) Field of Classification Search
CPC ............... H01M 8/04253; H01M 8/04223
See application file for complete search history.

(56) References Cited

U.S. PATENT DOCUMENTS

2001/0028967 A1* 10/2001 Roberts ............. H01M 8/04089
429/432
2003/0039870 A1* 2/2003 Busenbender .... H01M 8/04007
429/429
(Continued)

FOREIGN PATENT DOCUMENTS

DE   102004051751 A1    4/2006
JP   2005-149914    *   6/2005    ............. H01M 8/04
(Continued)

OTHER PUBLICATIONS

JP2005-149914, Machine Translation, Shiraishi, Jun. 2005.*

*Primary Examiner* — Devina Pillay
(74) *Attorney, Agent, or Firm* — Patent Central LLC; Stephan A. Pendorf

(57) ABSTRACT

A method for starting operation of a solid polymer fuel cell from a temperature below 0° C. is disclosed that prevents certain problems with ice formation as the fuel cell thaws. During startup, the method involves providing the volumetric oxidant flow at a rate less than two thirds of its maximum when the coolant temperature is near 0° C.

8 Claims, 4 Drawing Sheets

(51) Int. Cl.
*H01M 8/04223* (2016.01)
*H01M 8/2457* (2016.01)

(56) References Cited

U.S. PATENT DOCUMENTS

| | | | |
|---|---|---|---|
| 2005/0053809 A1 | 3/2005 | Hayashi et al. | |
| 2005/0238934 A1 | 10/2005 | Takahashi | |
| 2005/0255363 A1* | 11/2005 | Reinert | H01M 8/021 |
| | | | 429/457 |
| 2006/0086500 A1 | 4/2006 | Gottwich | |
| 2006/0134472 A1 | 6/2006 | Miyata et al. | |
| 2006/0141309 A1 | 6/2006 | Miyata et al. | |
| 2006/0199051 A1* | 9/2006 | Bai | H01M 8/04007 |
| | | | 429/425 |
| 2008/0113254 A1 | 5/2008 | Christie et al. | |
| 2008/0118799 A1* | 5/2008 | Matsumoto | H01M 8/04007 |
| | | | 706/45 |
| 2010/0028728 A1 | 2/2010 | Clingerman et al. | |
| 2010/0035097 A1 | 2/2010 | Lebzelter et al. | |
| 2014/0120444 A1* | 5/2014 | Zhang | H01M 8/04992 |
| | | | 429/444 |

FOREIGN PATENT DOCUMENTS

| | | | | |
|---|---|---|---|---|
| WO | 2004/004035 A2 | 1/2004 | | |
| WO | WO2008/061094 A1 * | 5/2008 | | H01M 8/04 |

* cited by examiner

FREEZE START METHOD FOR FUEL CELLS

BACKGROUND

Field of the Invention

This invention relates to methods for starting fuel cells from temperatures below 0° C. In particular, it relates to methods for preventing ice formation during startup.

Description of the Related Art

Proton exchange membrane fuel cells (PEMFCs) convert reactants, namely fuel (such as hydrogen) and oxidant (such as oxygen or air), to generate electric power. PEMFCs generally employ a proton conducting polymer membrane electrolyte between two electrodes, namely a cathode and an anode. A structure comprising a proton conducting polymer membrane sandwiched between two electrodes is known as a membrane electrode assembly (MEA). In a typical fuel cell, flow field plates comprising fluid distribution channels are provided on either side of a MEA to distribute fuel and oxidant to the respective electrodes and to remove by-products of the electrochemical reactions taking place within the fuel cell. Water is the primary by-product in a cell operating on hydrogen and air reactants. Because the output voltage of a single cell is low (of order of 1V), a plurality of cells are usually stacked together in series for commercial applications. And fuel cell stacks can be further connected in arrays of interconnected stacks in series and/or parallel for use in automotive applications and the like.

In certain applications, PEMFC stacks may be subjected to repeated on-off duty cycles involving storage for varied lengths of time and at varied temperatures. It is generally desirable to be able to reliably startup such stacks in a short period of time. Certain applications, like automotive, can require relatively rapid reliable startup from storage conditions well below freezing. This has posed a significant challenge both because of the relatively low rate capability of cells at such temperatures and also because of problems associated with water management in the cells when operating below 0° C. A certain amount of water is required for proper fuel cell operation (e.g. hydration of the membrane electrolyte) and is generated as a result of providing electrical power. However, ice of course forms where liquid water is present at such temperatures. The presence of ice can be problematic depending on how much there is and its location when stored or when starting up.

Various fuel cell designs and startup methods have been developed in the art to provide for improved startup from temperatures below freezing. For instance, US patent application serial numbers 20050053809 and 20060141309 both teach using greater oxidant flow rates than usual when starting up from temperatures below 0° C. Also, US patent application serial number 20010028967 teaches various methods employing reactant starvation to provide for improved startup. These methods are typically intermittent and involve starving the cell of reactant (i.e. where reactant stoichiometry is less than 1). Further, US patent application serial number 20060134472 teaches methods for operating a stack such that relatively dry conditions are maintained therein prior to storage. This can improve subsequent startup but may involve trading off optimum performance capability prior to shutdown.

Despite the advances made to date, there remains a need for more rapid, reliable startup methods for PEMFCs under all the operating conditions they may normally be expected to encounter. This invention fulfils these needs and provides further related advantages.

SUMMARY

It has been discovered that, under certain circumstances during startup from below freezing, ice undesirably can form in the flow field plates of PEMFCs near the thawing or melting point of water. Ice can particularly form near the oxidant outlets. Special consideration to the startup procedures, especially near the melting point then, can be required. It has been found that the volumetric oxidant flow rate may need to be limited during the thawing process. This can prevent water that has melted at one location in a PEMFC from moving, accumulating, and refreezing at another location. It can also be desirable to maintain the coolant flow rate at a high rate, preferably near its maximum. This can provide for a more uniform temperature distribution throughout the cell and to better transfer heat to the outlets of the cell.

More specifically the method comprises starting operation of a solid polymer fuel cell or stack from a temperature below 0° C. Such fuel cells comprise an anode, a cathode, a flow field for distributing fuel to the anode, a flow field for distributing oxidant to the cathode, and a coolant flow field for distributing coolant throughout the fuel cell. Further, such fuel cells are generally capable of operating over a range of volumetric oxidant flow rates, coolant flow rates and applied electrical loads at their nominal operating temperature. The method generally comprises providing a flow of fuel to the fuel flow field, providing a flow of oxidant to the oxidant flow field, providing a flow of coolant to the coolant flow field, applying an electrical load across the fuel cell, and measuring the coolant temperature. In particular though, the method is characterized in that the volumetric oxidant flow rate is provided at less than two thirds of the maximum volumetric oxidant flow rate when the coolant temperature is near 0° C.

In the method, the oxidant stoichiometry is generally greater than or equal to 1 and particularly when the coolant temperature is near 0° C. Thus, the fuel cell is not being starved of reactant.

Most importantly, the volumetric oxidant flow rate is provided at less than two thirds the maximum volumetric oxidant flow rate when the coolant temperature is near the melting point of water, such as between −5° C. and +5° C. It may therefore be possible or even desirable to employ an volumetric oxidant flow rate at greater than two thirds the maximum volumetric oxidant flow rate when the coolant temperature is not near the melting point, e.g. when below −5° C. or above +5° C.

While maintaining low volumetric oxidant flow rates can be effective in preventing certain problems on startup, too low a flow rate may be undesirable for other reasons. However, volumetric oxidant flow rates greater than a one third of the maximum volumetric oxidant flow rate can for instance be used successfully when the coolant temperature is near 0° C.

In the method, the coolant temperature can be measured at the coolant outlet of the fuel cell. Alternatively, the coolant temperature can be determined by averaging the temperatures measured at both the coolant inlet and outlet.

The method has been found to be especially suitable for a cell comprising a flow field for distributing oxidant to the cathode which comprises a backfeed duct at the oxidant outlet.

The method can be incorporated into a fuel cell system by employing a control subsystem configured for starting operation of the fuel cell according to the method. The invention therefore includes methods of starting fuel cell and stacks and fuel cell systems comprising a control subsystem configured for starting according to these methods.

These and other aspects of the invention are evident upon reference to the attached Figures and following detailed description.

DETAILED DESCRIPTION

Figure 1:
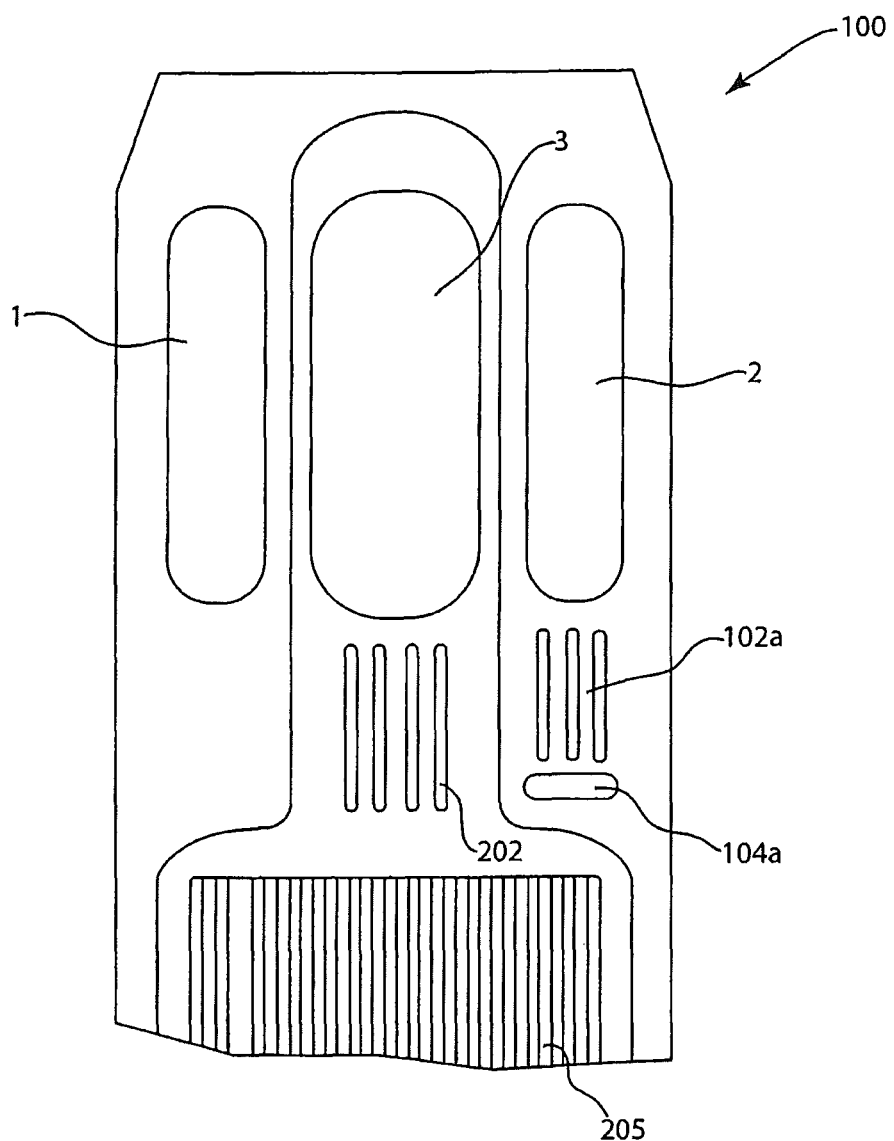
FIG. 1 shows a section of a prior art flow field plate from a PEMFC comprising a backfeed duct in the oxidant outlet (reproduced from US2008/0113254).

In the effort to reduce startup times from below 0° C., it has been found that factors including the volumetric oxidant flow rate and cold spots in a fuel cell stack can result in issues with ice formation, flow field blockage, and a failure to start properly. Ice present in a cell following a shutdown can melt near the thawing point and move and refreeze elsewhere in the cell during startup. Simple procedures, especially for the critical period when the stack starts to thaw, have been developed to address this problem.

Herein, the following definitions have been used.

Nominal operating conditions, such as nominal operating temperature or nominal operating power, refers to the prescribed or rated values for a given fuel cell or fuel cell stack. For instance, a stack may fundamentally be capable of operating over a wide range of temperatures, and does in fact do so temporarily during startup and/or shutdown. However, the stack is typically prescribed to operate at a specific or nominal temperature or temperature range. Further still, certain nominal operating conditions, such as coolant flow rate may vary according to temperature or other factors (e.g. the coolant flow rate prescribed at below freezing temperatures during startup may typically be less than that prescribed at the nominal steady state operating temperature).

In a like manner, a maximum operating condition, and particularly a maximum volumetric oxidant flow rate, refers to the maximum nominal volumetric oxidant flow rate for the stack. Thus, a specific compressor used in a fuel cell system may be capable of much greater air flow rates than what is prescribed for nominal operation. Nonetheless, the maximum volumetric oxidant flow rate would be the maximum prescribed.

As used herein, the average coolant temperature in a fuel cell stack is the simple average of the measured inlet and outlet coolant temperatures.

And herein, stoichiometry is defined as the ratio, at any given instant, of the rate at which reactant is supplied to the fuel cell divided by the rate at which the reactant is consumed in the electrochemical reactions in the fuel cell. A reactant starvation condition exists whenever the reactant stoichiometry is less than 1, that is whenever less reactant is being supplied to the fuel cell than is being consumed within the fuel cell at any given instant. (Such a situation is temporary since the fuel cell cannot consume reactant faster than it is supplied indefinitely. If the rate at which reactant is supplied remains constant during a starvation, the rate at which reactant is consumed will fall until it eventually matches the rate supplied, i.e., the stoichiometry eventually increases to 1.)

PEMFCs may operate on a variety of fuels, including hydrogen, methanol, dimethyl ether, etc., and various oxidants, including pure oxygen or ambient air. Because the electrochemical reactions taking place can generate much heat, coolants, including circulating liquids or forced air, are often used to regulate temperature. For automotive applications, typically pure hydrogen and air are supplied as the reactants and a conventional antifreeze solution (a water and ethylene glycol mixture) is employed for a circulating coolant.

FIG. 1 (which is reproduced in part from US2008/0113254) illustrates a view of the oxidant and coolant side at one end of a flow field plate for a conventional PEM fuel cell in automotive applications. Flow field plate 100 comprises a set of ports for the reactants and the coolant, namely fuel port 1, air port 2, and coolant port 3. Here, plate 100 uses a backfeed design to provide both fuel and air to their respective flow fields. Flow field plate 100 mates with a similar, but oppositely facing plate (not shown) to form a coolant flow field 205 within the assembly. At one end of this two-plate assembly, coolant enters through port 3, is guided through the transition region 202 to the coolant flow field 205, and then exits through a similar port provided at the other end of flow field plate 100 (not shown). Fuel and air flow fields (not shown) are provided on opposite sides of this two-plate assembly so as to appropriately face anodes and cathodes respectively in MEAs of neighboring cells in the fuel cell stack. Air is provided at one end of the two-plate assembly via air port 2, is guided through the transition region 102a to air backfeed slot 104a, through plate 100 to the air flow field on the opposite side of plate 100, and then exits through a similar port and backfeed slot at the other end of plate 100. In a like manner, fuel is directed to and from the two-plate assembly via a similar backfeed design provided in the oppositely facing flow field plate (not shown).

During rapid startup from below freezing temperatures, melted water can accumulate and refreeze particularly in the outlet regions of the backfeed channels and backfeed slots and even more particularly in the outlet regions of the air backfeed channels 102a and air backfeed slots 104a. If these outlet regions are blocked or even partially obstructed, the reactant air cannot efficiently exit the cathode side of the flow field plate 100. Such a blockage during a freeze startup can manifest itself mainly as a rise in the oxidant pressure differential within the fuel cell stack. However, lowered stack voltage and increases in oxidant inlet pressure and hydrogen emissions can also be observed. (Hydrogen emissions occur due to the "hydrogen pumping" phenomenon whereby a blockage occurring on the cathode prevents oxygen from reacting with the protons crossing the membrane electrolyte. Hence hydrogen is produced on the cathode instead of water and exits the stack at the oxidant outlet.)

To prevent this type of blockage from happening, it has been discovered that certain limitations are required during the startup procedure, particularly near thawing temperatures. In particular, the air or volumetric oxidant flow rate should be limited, but not so much as to reactant starve the fuel cell. (While the volumetric and mass flow rates of oxidant are related as illustrated in the following Examples, the volumetric flow rate is believed to be of more importance in the context of the present invention.) Generally, the method requires the volumetric oxidant flow rate to be substantially below the maximum nominal volumetric oxidant flow rate in the thaw zone. While the numerical value may vary somewhat with fuel cell design and application, a volumetric oxidant flow rate less than two thirds the maximum volumetric oxidant flow rate is required in the thaw zone. As it is not practical to instrument commercial fuel cell stacks so as to be able to measure the temperature distribution throughout the stack, the coolant temperature may be used to approximately indicate the onset of thawing within the fuel cell stack. Thus, the method comprises limiting the volumetric oxidant flow rate to less than two thirds the maximum volumetric oxidant flow rate when the coolant temperature is near 0° C. Again, while the numerical values may vary somewhat with fuel cell design and operating parameters, the fuel cell stack can be considered to be in the thaw zone when the coolant temperature is between about −5° C. and +5° C.

Limiting the oxidant or air flow in this way prevents the accumulation and refreezing of water in the oxidant flow fields which can occur when ice melts in one part of the stack and then refreezes in another (and particularly in colder regions in the area of the outlets). Limiting the volumetric oxidant flow rate to less than two thirds the maximum volumetric oxidant flow rate is effective, for instance in stacks designed for automotive use. Also though, as shown in the Examples below, the volumetric oxidant flow rate can still be greater than one third the maximum and still allow for acceptable startups. This is useful since greater than a minimal oxidant flow can be desirable for other reasons.

While the volumetric oxidant flow rate may be so limited for the duration of the startup procedure, it is not necessary when the stack is so cold that no thawing or melting of ice within can occur. Also, it is not necessary once the stack has entirely thawed and ice cannot refreeze within. Thus, outside the thaw zone, the volumetric oxidant flow rate need not be so limited. Again, because a variety of factors are involved, generally ice isn't expected to melt within if the coolant temperature is below about −5° C. Nor is it expected to refreeze anywhere within if the coolant temperature is above about +5° C. Hence outside this temperature range, greater volumetric oxidant flow rates may be expected to be acceptable.

The coolant temperature of course is not completely uniform throughout the stack during a transient startup or at any time during operation. Generally however the difference in coolant temperature throughout the system is not so great. For purposes herein, an average of the coolant temperature may be used to control startup (e.g. a simple average of measured temperatures at the stack inlet and outlets). Alternatively, a measurement at the location where ice blockages may most likely be expected may be preferred (e.g. near the oxidant outlet in the unit cell, which may also roughly be the location of the coolant outlet port).

The volumetric oxidant or air flow rate can be controlled in various ways as is known to those skilled in the art. For instance, with a constant pressure supply of oxidant to the fuel cell stack, volumetric flow rate can be controlled using a variable valve in the oxidant inlet or exhaust line. Here, closing the variable valve results in a reduced volumetric oxidant flow rate, but also results in a reduced mass oxidant flow rate as well. It may however be desirable to maintain a relatively constant mass oxidant flow rate to the fuel cell stack, while still reducing the volumetric flow rate in accordance with the invention. This may instead be accomplished by increasing the pressure of the oxidant supplied to the stack while simultaneously allowing some of the supplied oxidant to bypass the stack (i.e. supplied oxidant is allowed to flow directly from the oxidant inlet line of the stack to the oxidant outlet line of the stack, thereby bypassing the stack altogether. This may simply be accomplished by incorporating an appropriate bypass line and regulating valve in the fuel cell system). In this way, the pressure of the oxidant supplied to the fuel cell stack can be increased while simultaneously reducing the volume of oxidant supplied to the fuel cell stack. If done proportionally, a relatively constant mass oxidant flow rate may be achieved.

While volumetric oxidant flow rate has been found to be an important factor for successful, rapid startup from subzero temperatures, other factors can also be important for success too. As shown in the illustrative examples below, maintaining a certain minimum coolant flow rate can also be important. Lower coolant flow rates may allow the fuel cell to heat up faster (and hence be able to deliver full power faster) than the rest of the system but it can also lead to local hot and cold spots. Therefore, maintaining a minimum coolant flow rate can be desirable in order to prevent this by reducing the temperature variation within the fuel cell. As will be appreciated, other factors known to those skilled in the art may also need attention for a successful rapid startup in a given embodiment.

The following examples are illustrative of the invention but should not be construed as limiting in any way.

EXAMPLES

Examples Showing the Problem

An automotive fuel cell stack was constructed that was nominally rated to provide 94 KW at an operating temperature of 63° C. The stack comprised 408 solid polymer electrolyte fuel cells stacked in series with each employing carbon based flow field plates for the fuel, oxidant, and coolant. The oxidant flow field plates employed a backfeed design similar in function to that shown in FIG. 1. In this stack, pure hydrogen was used as the fuel and air as the oxidant. The coolant was a conventional antifreeze mixture of water and ethylene glycol. When operating under nominal conditions, the flow of fuel, air, and coolant vary in accordance with applied electrical load and surrounding temperature conditions. During nominal operation, the reactant stoichiometry varies with load but never goes below 1.8 under nominal conditions nor below 1.6 at peak load conditions. The range of mass flow rates for the fuel and air were in the ranges from about 100-2250 slpm and 260-5080 slpm respectively.

Figure 2:
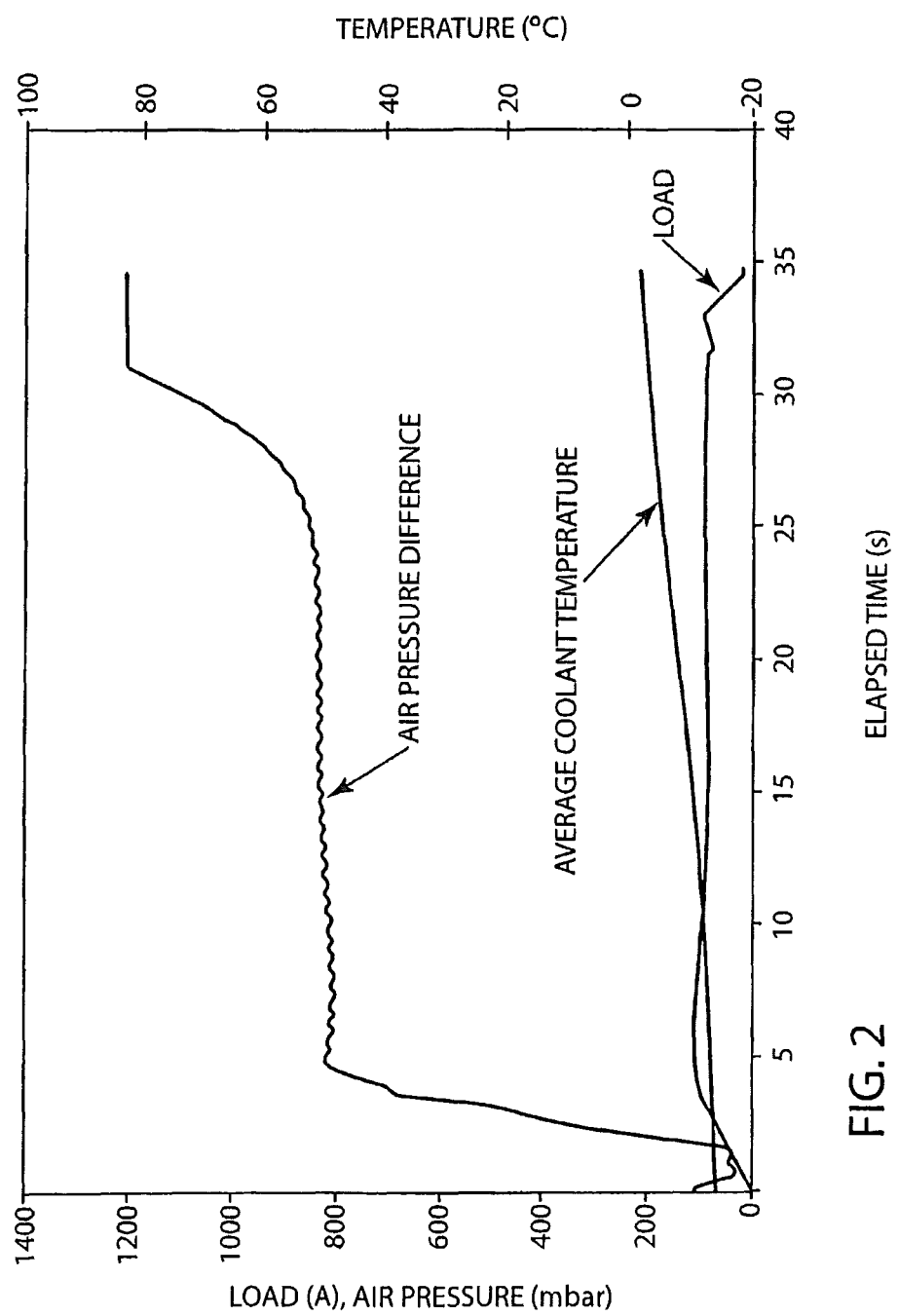
FIG. 2 plots the load, average coolant temperature, and the difference in air pressure across the fuel cell stack from inlet to outlet versus time for the automotive stack in the Examples that failed to start properly using the maximum air flow rate.

The stack was operated under nominal conditions for some time, and was then shutdown in a normal fashion and stored at −15° C. For subsequent startup from −15° C., the following conventional operating setpoint conditions were employed: a fuel flow rate of 2250 slpm, the maximum mass air flow rate of 1630 slpm, and a coolant flow rate of 10 lpm. With regards to the electrical load applied, the initial startup routine entails requesting 340 A while maintaining a stack voltage of 170V. Stoichiometry was not controlled but was always well in excess of 1. During freeze startup, several operation variables were monitored continuously including voltage, load, the coolant inlet and outlet temperatures, power, and the difference in pressure between the air inlet and the air outlet. FIG. 2 plots the load, the average coolant temperature (i.e. the average of the measured coolant inlet and outlet temperatures) and the difference in air pressure across the fuel cell stack (the difference between the air inlet and outlet pressures) versus elapsed time. After about 25 seconds into the startup, the difference in air pressure increased sharply and exceeded 1.2 bar. Because this differential pressure was the maximum allowable for this stack, the startup was halted. Ice formation in the air flow field was suspected of causing this rise in differential pressure due to blockage with a subsequent buildup of air pressure in the air flow field.

To study the startup failure observed in the preceding test, a "shorter" stack was constructed using the same type of cells but fewer in number (20 cells in series). The short stack was subjected to the same testing conditions on a per cell basis (i.e. flow rates, etc. were scaled according.) In particular, the maximum mass air flow rate for the stack was again used during startup, namely 4270 slpm, and the coolant flow rate was 0.5 lpm. However here, the short stack was disassembled and analyzed at various points during the test. For successive points, the stack was reassembled and subjected to a repeat of this procedure (i.e. nominal operation, shutdown, freeze startup). In order to minimize changes in the state of water in the stack, this disassembly and analysis was done at temperatures near −15° C.

Upon disassembling the stack just prior to startup, a significant amount of ice was observed on the cathode flow field plates. Apparently therefore, the nominal operating conditions for this stack combined with the shutdown procedure resulted in a significant amount of water remaining on the cathode plates. The stack then was started up using the scaled startup procedure and monitored continuously as before. Shortly into the test, a spike was again observed in the differential air pressure. As before, the spike was substantial enough to warrant stopping the startup procedure. Upon disassembling the stack at this point, it was discovered that the location of much of the ice in the stack had changed, with the backfeed duct regions at the air outlets now containing a large amount of ice. Apparently what had happened then was that ice in the stack had melted during startup. Water from this melted ice then was carried towards the air outlets whereupon it re-froze, mainly in the backfeed ducts. In turn, this blocked much of the air outlets, and thus caused an unacceptable increase in air pressure in the cathode flow fields.

Examples with Reduced Oxidant Flow

The short stack above was then put through a series of tests where different air flow rates were used during startup (two tests at each air flow rate). Due to the nature of the experimental test setup, the supplied air (oxidant) pressure varied with the mass air flow rate. As a result, the volumetric air flow rate did not vary in direct proportion to that of the measured mass air flow rate. The volumetric air flow rate was at its maximum when the mass air flow rate was at its maximum. In other cases, volumetric air flow rate was roughly calculated from the measured mass air flow rate and observed approximate average air pressure supplied to the short stack. Table 1 below summarizes the results of this testing and lists the relative mass air flow rate, the approximate air pressure recorded, the calculated relative volumetric air flow rate, whether an unacceptable spike in differential air pressure was observed, and the average coolant temperature at which this occurred.

TABLE 1

| Relative mass air flow rate | Approximate air pressure (bar absolute) | Relative volumetric air flow rate | Unacceptable spike in differential air pressure? | Average coolant temperature at time of spike (° C.) |
|---|---|---|---|---|
| Maximum | 2.3 | Maximum | Yes | 1.8 |
| Maximum | 2.3 | Maximum | Yes | 1.0 |
| ¾ maximum | 2.1 | 83% maximum | Yes | 1.8 |
| ¾ maximum | 2.1 | 83% maximum | Yes | 1.7 |
| ½ maximum | 1.8 | 63% maximum | Yes | 7.7 |
| ½ maximum | 1.8 | 63% maximum | Yes | 5.5 |
| ¼ maximum | 1.6 | 36% maximum | No | Not applicable |
| ¼ maximum | 1.6 | 36% maximum | No | Not applicable |

Figure 3A:
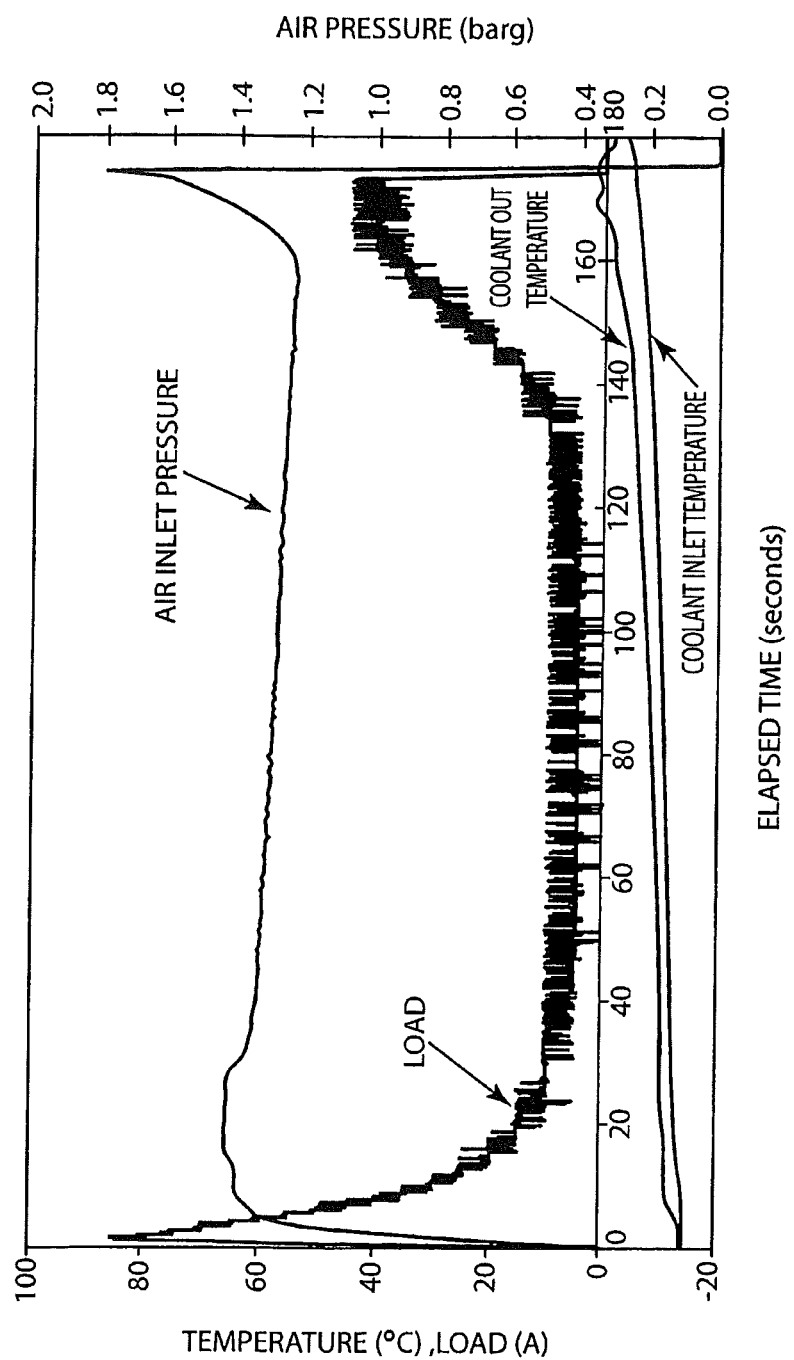
FIGS. 3a and 3b plot the load, inlet and outlet coolant temperatures, and the air inlet pressure for the "short" stack in the Examples when using the maximum air flow rate and ⅓ of the maximum volumetric air flow rate (or ¼ of the maximum mass air flow rate) respectively.
Figure 3B:
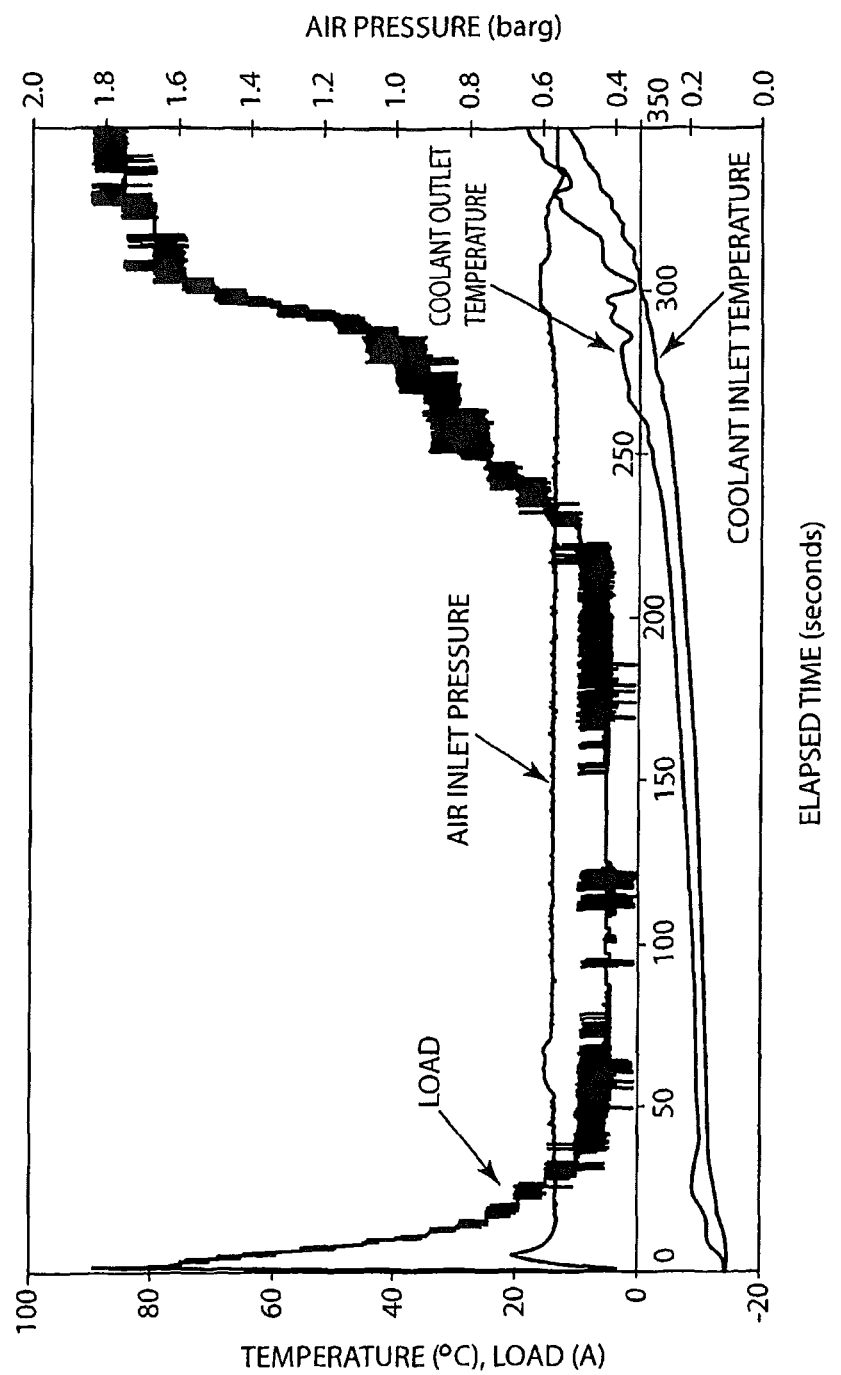

FIGS. 3a and 3b show exemplary results for tests done at the maximum mass (and volumetric) air flow rate and at about ⅓ of the maximum volumetric air flow rate (or ¼ of the maximum mass air flow rate) respectively. Here, the plots include the load, both the inlet and outlet coolant temperatures, and the air inlet pressure provided to the short stack. The presence of a spike in air pressure is evident after about 160 seconds in FIG. 3a. However, no spike was observed in air pressure in FIG. 3b where the stack started without problem.

From Table 1, it can be seen that a volumetric air flow rate less than about ⅔ maximum was needed to avoid getting an unacceptable spike in pressure across the air flow fields. However, a flow rate of ⅓ maximum allowed for an acceptable startup without severely blocking the flow fields with ice. Although the exact flow rates to prevent such spikes may differ somewhat in a larger stack, lowering the air flow rate during startup can clearly prevent such failures on startup. (Note: further testing was performed but is not reported here. Qualitatively this testing showed that the lower the air flow was during the startup, the higher the allowable heat-up rate could be.)

Illustrative Example with Varied Coolant Flow Rates

As demonstrated above, the method of the invention was required for a successful startup in the preceding test stacks. However, other factors are also important to consider for success. For instance, an appropriate coolant flow rate can also be important. To illustrate this, a similar short stack to that described above, this time with 10 cells, was put through tests to compare results when different coolant flow rates were used during startup. Two different coolant flow rates were used than in the preceding, a much lower value of 0.15 lpm and a higher value of 0.5 lpm. Upon startup, the stack with the relatively low coolant flow rate exhibited a large unacceptable spike (to over 1.3 bar) in the differential air pressure at about 300 seconds into startup. Also noted was a relatively long time lag between the coolant inlet temperature and the coolant outlet temperature (the former lagging the latter). And the coolant outlet temperature was well below freezing even when significant power was being generated (at about 70 seconds into startup) suggesting that significant heat was begin generated in the middle of the stack even if not apparent at the outlet.

On the other hand, the stack starting with the higher coolant flow rate did not show a significant spike in the differential air pressure and started up without any apparent ice blockage. From this example, it can be seen that use of a lower coolant flow rate can also result in an unacceptable spike in pressure across the air flow fields. However, use of a higher coolant flow rate allowed for an acceptable startup without severely blocking the flow fields with ice.

Other Illustrative Examples

A special instrumented set of flow field plates was made to determine the temperature profile within the fuel cells used in the preceding tests during a problematic startup. The plates were instrumented with numerous thermocouples placed at various locations along their length. During a startup like that used in the first example above, it was noticed that the backfeed duct of the air outlet was about 1-2° C. colder than the coolant outlet temperature and about 8-10° C. colder than some areas in the middle of the plate. The area around the backfeed duct is not electrochemically active (and thus generates no heat) and, in this particular cell design, it is relatively far from the circulating coolant (~1 cm away). Not surprisingly perhaps then, water in this area might refreeze and block the flow field even though the coolant temperature is above freezing.

Some ex-situ experiments were conducted on flow field plates like those used in the fuel cells above in order to study the flow of water and ice at different temperatures. One of the findings was that water could be super-cooled at temperatures just below zero (e.g. ~−5° C.) and still remain in the liquid phase until disturbed, by airflow for example. This phenomenon could be observed and confirmed by eye.

All of the above U.S. patents, U.S. patent application publications, U.S. patent applications, foreign patents, foreign patent applications and non-patent publications referred to in this specification, are incorporated herein by reference in their entirety.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings. Such modifications are to be considered within the purview and scope of the claims appended hereto.

What is claimed is:

1. A method for starting operation of a solid polymer fuel cell from a temperature below 0° C., the fuel cell comprising an anode, a cathode, a flow field for distributing fuel to the anode, a flow field for distributing oxidant to the cathode, and a coolant flow field, separate from the flow field for distributing fuel to the anode and the flow field for distributing oxidant to the cathode, for distributing coolant throughout the fuel cell, the fuel cell being capable of operating over a range of volumetric oxidant flow rates up to a maximum volumetric oxidant flow rate, and over a range of coolant flow rates and applied electrical loads at the nominal operating temperature of the fuel cell, the method comprising:
   determining that the temperature is below 0° C.;
   providing a flow of fuel to the fuel flow field;
   compressing oxidant in a compressor and providing a flow of compressed oxidant to the oxidant flow field at a volumetric oxidant flow rate;
   providing a flow of coolant to the coolant flow field;
   applying an at least nominal and at most peak electrical load across the fuel cell; and
   measuring the average coolant temperature in the fuel cell stack;
wherein the volumetric oxidant flow rate is limited to less than two thirds and greater than one third of the maximum volumetric oxidant flow rate when the average coolant temperature is between −5° C. and +5° C., and wherein the volumetric oxidant flow rate is not limited to less than two thirds of the maximum volumetric oxidant flow rate when the coolant temperature is below −5° C. or above +5° C.

2. A method for starting operation of a solid polymer fuel cell from a temperature below 0° C., the fuel cell comprising an anode, a cathode, a flow field for distributing fuel to the anode, a flow field for distributing oxidant to the cathode, and a coolant flow field, separate from the flow field for distributing fuel to the anode and the flow field for distributing oxidant to the cathode, for distributing coolant throughout the fuel cell, the fuel cell being capable of operating over a range of volumetric oxidant flow rates up to a maximum volumetric oxidant flow rate, and over a range of coolant flow rates and applied electrical loads at the nominal operating temperature of the fuel cell, the method comprising:
   determining that the temperature is below 0° C.;
   providing a flow of fuel to the fuel flow field;
   compressing oxidant in a compressor and providing a flow of compressed oxidant to the oxidant flow field at a volumetric oxidant flow rate;
   providing a flow of coolant to the coolant flow field;
   applying an at least nominal and at most peak electrical load across the fuel cell; and
   measuring the average coolant temperature in the fuel cell stack;
wherein coolant flow rate is near maximum and volumetric oxidant flow rate is provided at less than two thirds of the maximum volumetric oxidant flow rate when the average coolant temperature is between −5° C. and +5° C., the electrical load across the fuel cell being at least nominal and at most peak.

3. A method for starting operation of a solid polymer fuel cell from a temperature below 0° C., the fuel cell comprising an anode, a cathode, a flow field for distributing fuel to the anode, a flow field for distributing oxidant to the cathode, and a coolant flow field, separate from the flow field for distributing fuel to the anode and the flow field for distributing oxidant to the cathode, for distributing coolant throughout the fuel cell, the fuel cell being capable of operating over a range of volumetric oxidant flow rates up to a maximum volumetric oxidant flow rate, and over a range of coolant flow rates and applied electrical loads at the nominal operating temperature of the fuel cell, the method comprising:
   determining that the temperature is below 0° C.;
   providing a flow of fuel to the fuel flow field;
   compressing oxidant in a compressor and providing a flow of compressed oxidant to the oxidant flow field at a volumetric oxidant flow rate;
   providing a flow of coolant to the coolant flow field;
   applying an at least nominal and at most peak electrical load across the fuel cell; and
   measuring the average coolant temperature in the fuel cell stack;
wherein the volumetric oxidant flow rate is limited to less than two thirds of the maximum volumetric oxidant flow rate when the average coolant temperature is between −5° C. and +5° C., and wherein the volumetric oxidant flow rate is not limited to less than two thirds of the maximum volumetric oxidant flow rate when the average coolant temperature is below −5° C. or above +5° C.

4. The method of claim 3, wherein the oxidant stoichiometry is greater than or equal to 1 when the average coolant temperature is between −5° C. and +5° C.

5. The method of claim 3, wherein the volumetric oxidant flow rate is provided at greater than two thirds the maximum volumetric oxidant flow rate when the average coolant temperature is below −5° C. or above +5° C.

6. The method of claim 3, wherein the average coolant temperature is the average of the temperature measured at the coolant inlet and the temperature measured at the coolant outlet of the fuel cell.

7. The method of claim 3, wherein the flow field for distributing oxidant to the cathode comprises an oxidant outlet and a backfeed duct at the oxidant outlet.

8. A method of claim 3, wherein a stack of said solid polymer fuel cells are electrically connected in series to form a solid polymer fuel cell stack.

* * * * *